(12) United States Patent
Khetarpal (10) Patent No.: US 12,079,189 B2
(45) Date of Patent: *Sep. 3, 2024

(54) AUTOMATED DATABASE CACHE RESIZING

(71) Applicant: ServiceNow, Inc., Santa Clara, CA (US)

(72) Inventor: Ankit Khetarpal, San Jose, CA (US)

(73) Assignee: ServiceNow, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/980,223

(22) Filed: Nov. 3, 2022

(65) Prior Publication Data
US 2023/0057160 A1 Feb. 23, 2023

Related U.S. Application Data

(63) Continuation of application No. 17/002,465, filed on Aug. 25, 2020, now Pat. No. 11,520,767.

(51) Int. Cl.
*G06F 16/22* (2019.01)
*G06F 9/30* (2018.01)
*G06F 11/34* (2006.01)
*G06F 16/21* (2019.01)
*G06F 16/2455* (2019.01)

(52) U.S. Cl.
CPC ...... *G06F 16/2282* (2019.01); *G06F 9/30047* (2013.01); *G06F 11/3419* (2013.01); *G06F 16/214* (2019.01); *G06F 16/24552* (2019.01)

(58) Field of Classification Search
CPC .. G06F 16/217; G06F 16/2282; G06F 16/214; G06F 16/24552; G06F 11/3409; G06F 11/3419; G06F 2201/80; G06F 2201/81
See application file for complete search history.

(56) References Cited

U.S. PATENT DOCUMENTS

| | | | |
|---|---|---|---|
| 5,774,386 A | 6/1998 | Pawle | |
| 7,359,890 B1* | 4/2008 | Ku | G06F 16/24552 |
| 7,783,852 B2* | 8/2010 | Lahiri | G06F 12/023 |
| | | | 711/170 |
| 8,553,876 B1 | 10/2013 | Spracklen | |
| 2006/0020767 A1 | 1/2006 | Sauermann | |
| 2007/0174838 A1 | 7/2007 | Cotner | |
| 2008/0256303 A1 | 10/2008 | Croxford | |
| 2011/0113036 A1 | 5/2011 | Idicula | |

(Continued)

FOREIGN PATENT DOCUMENTS

JP H0793198 A * 4/1995 ............. G06F 12/00

*Primary Examiner* — James E Richardson
(74) *Attorney, Agent, or Firm* — Van Pelt, Yi & James LLP (57) ABSTRACT

A test query of a database is performed in response to determining that a performance associated with a user database query of the database does not satisfy a first performance threshold. In response to a determination that the performance of the test query satisfies a second performance threshold, a database buffer cache of the database is resized. Resizing the database buffer cache includes: determining a metric based at least in part on a storage size of the database and an index size of the database, and resizing the database buffer cache of the database based on the metric and a size of the database buffer cache.

20 Claims, 6 Drawing Sheets

(56) References Cited

U.S. PATENT DOCUMENTS

| | | | |
|---|---|---|---|
| 2011/0288847 A1* | 11/2011 | Narayanan | G06F 11/3447 |
| | | | 703/19 |
| 2012/0221577 A1 | 8/2012 | Fuh | |
| 2016/0026406 A1 | 1/2016 | Hahn | |
| 2016/0092412 A1 | 3/2016 | Seki | |
| 2017/0031592 A1 | 2/2017 | More | |
| 2019/0042402 A1 | 2/2019 | Chhabra | |
| 2019/0129856 A1 | 5/2019 | Sebastien | |
| 2020/0012602 A1* | 1/2020 | Zhao | G06F 17/11 |
| 2021/0089540 A1* | 3/2021 | Karl | G06F 16/24562 |
| 2021/0089552 A1 | 3/2021 | Ruediger | |

* cited by examiner

AUTOMATED DATABASE CACHE RESIZING

CROSS REFERENCE TO OTHER APPLICATIONS

This application is a continuation of U.S. patent application Ser. No. 17/002,465 entitled AUTOMATED DATABASE CACHE RESIZING filed Aug. 25, 2020 which is incorporated herein by reference for all purposes.

BACKGROUND OF THE INVENTION

Cloud service platforms allow a business to host a network accessible service with many benefits over a traditional software application including increased accessibility and availability. Unlike traditional applications, such as desktop applications, customers can access the services from a variety of network clients often with only minimal limitations on the client. Cloud-based services also offer improved flexibility. For example, the services can be updated and deployed under the guidance and control of the service provider. With cloud-based services, persistent state is often required due to their network and distributed nature. Many cloud services rely on one or more forms of data storage for storing persistence information. Often, cloud services will utilize a database server for storing persistent data. Databases, including relational databases, allow an application to store and subsequently query a diverse and large dataset. For example, complex queries can be dynamically performed to retrieve relevant data. Using a pairing of an application server with a database backend, complex and highly valuable cloud services can be offered with benefits not typically available in more traditional client-hosted applications. However, as these cloud services become increasingly complex and feature rich, the amount and complexity of the dataset and dataset relationships can increase. Demand for increased performance and availability of the database server can also increase. There is a need to maintain a highly optimized and efficient performing database server to support the provided cloud services.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic database cache resizing is disclosed. Using the techniques disclosed herein, the cache or buffer cache of a database can be dynamically resized. The resizing allows the database server to continue to operate at a high-performance level even as demands to the database server change. In some embodiments, the disclosed techniques allow a cloud service to scale as the demand and/or workload fluctuates, for example, in response to increases in the number and/or type of database queries. In various embodiments, database query performance is monitored, and a slow database query triggers the process to determine whether and how to adjust the database buffer cache to allow subsequent queries to perform more efficiently. The resizing process can include analyzing the performance of one or more test queries. In the event an initial query is slow but a subsequent test query is not, the database buffer cache may require resizing. In various embodiments, the disclosed techniques can determine both when and by what parameters a database cache should be resized. For example, the buffer cache can be resized when the largest table of the database is larger than the database buffer pool. The database buffer pool can be resized to a larger size based on calculating the size of the database storage and the size of the database index. For example, the new buffer cache size can be reconfigured to be 70% of the sum of the size of the database storage and database index. Using the disclosed techniques, a database server can continue to run in a highly optimized and efficient manner with little to no administrator intervention while also limiting potential downtime and performance bottlenecks to the corresponding cloud service.

In some embodiments, a determination is made that the performance of a user database query to a database does not meet a first performance threshold. For example, an SQL query to a relational database, such as a MySQL database, is determined to be a slow query. The query may have a response time that is twice or more than the average response time of the database, thereby exceeding the first performance threshold. In response to the determination that the performance of the user database query does not meet the first performance threshold, one or more test queries of the database are performed. For example, the slow database query is run again as a test query and its performance is monitored. The test query may have a similar slow response time to the initial query, have a faster response time that is closer to the average query response time, or have another result. For example, in some instances, the query is so slow that it does not complete. In various embodiments, a determination is made whether a performance of the one or more test queries meets a second performance threshold. For example, the response time of a test query is compared to a second performance threshold. In some embodiments, the second performance threshold is the same as the first performance threshold. For example, both the first and second performance threshold can be a multiple of the average query response time such as twice the average response time. In some embodiments, the response time of the test query is compared to the average response time and/or the second performance threshold is less than the first performance threshold. In some embodiments, the measured response time is used to determine that the execution of the test query will not complete. In some embodiments, in the event one or more slow test queries do not complete, the database cache is a candidate for resizing. But in the event one or more slow test queries do complete, the database cache is not resized. Instead, the slow user query, as indicated by a slow test query that completes successfully, may require tuning to improve performance instead of database cache resizing. In various embodiments, a test query meets the second performance threshold if the response time of the test query is faster than (or below) the second performance threshold. An average or faster response time for a test query compared to the initial slow query can indicate that the query is now cached.

In response to a determination that the performance of the one or more test queries does meet the second performance threshold, an analysis is performed to determine whether to resize a database buffer cache of the database. For example, the response times are analyzed to determine whether resizing the database buffer cache will improve the database performance. In the event one or more test queries are not slow by comparing the response times of the test queries to the second performance threshold, additional analysis is performed to determine whether and how to resize the database cache. In some embodiments, the database cache size is resized if the largest table is now larger than the database buffer pool. This scenario typically indicates that a larger buffer cache would improve database query performance. In some embodiments, the new size of the buffer cache is based on adding together the size of the database storage and the size of the database index. For example, the new buffer cache size can be configured to be 5/7th or approximately 71.4% of the sum of the database storage and index size. In some embodiments, a similar scaling factor is used to determine the buffer cache size, such as a percentage value between 65% and 75%, or another comparable value. In some embodiments, the scaling factor is applied to the size of the database storage alone without considering the database index size. In some embodiments, the analysis to determine whether and by how much to resize a database buffer cache of the database is performed in response to a slow test query that does not complete successfully. As with the scenario where the performance of the one or more test queries does meet the second performance threshold, additional analysis is performed to determine whether the proper conditions exist to benefit from cache resizing and a new appropriate cache size if applicable.

Figure 1:
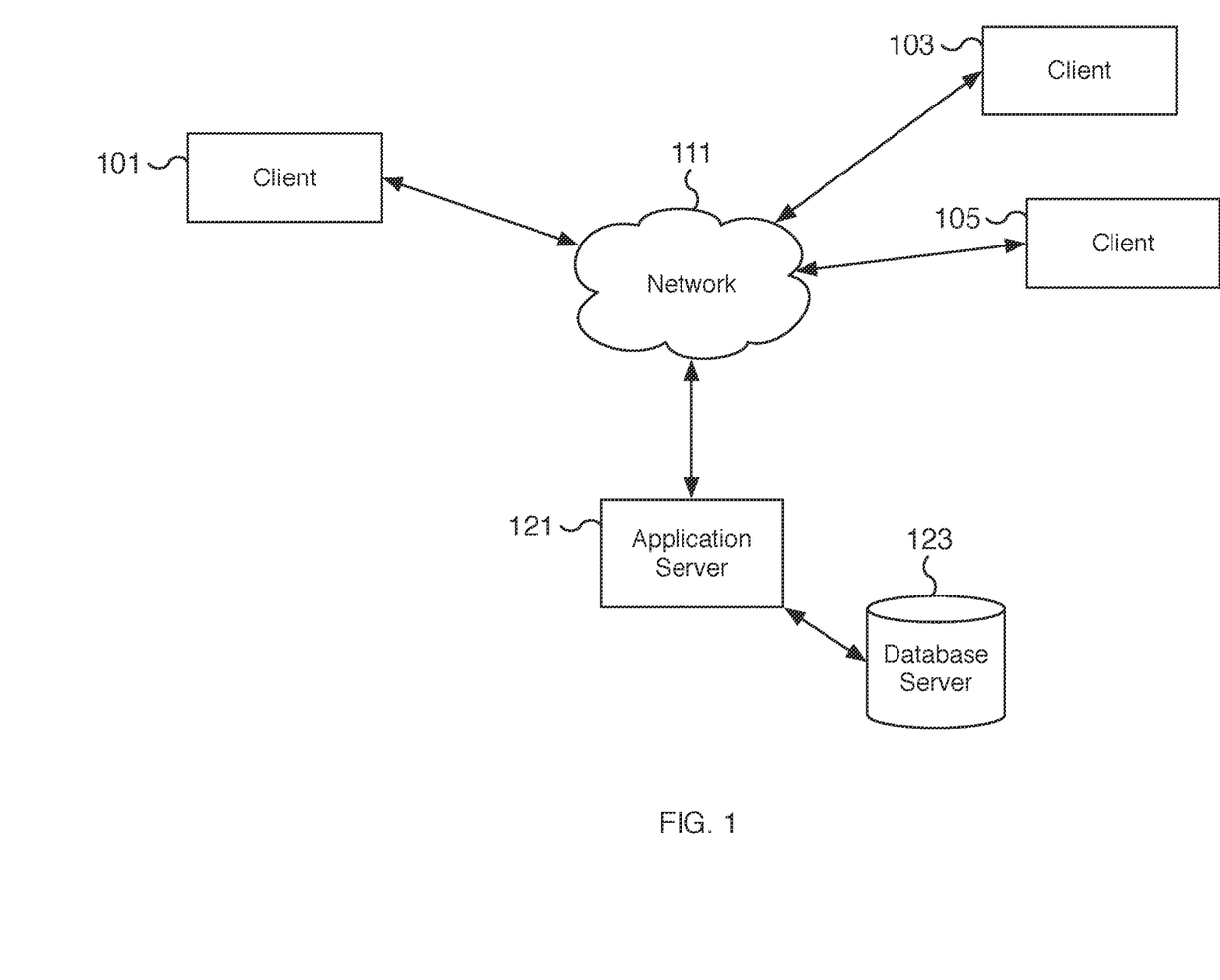
FIG. 1 is a block diagram illustrating an example of a network environment of a database-backed cloud service.

FIG. 1 is a block diagram illustrating an example of a network environment of a database-backed cloud service. In the example shown, clients 101, 103, and 105 access cloud-based services hosted by application server 121 via network 111. Network 111 can be a public or private network. In some embodiments, network 111 is a public network such as the Internet. In various embodiments, clients 101, 103, and 105 are network clients such as web browsers for accessing web services. Application server 121 provides web services including web applications such as web-based configuration management database (CMDB) services. Application server 121 utilizes database server 123 for storing and retrieving data. For example, data is written to and retrieved from database server 123. In some embodiments, database server 123 is a relational database such as a MySQL database. In various embodiments, database server 123 responds to database queries such as SQL queries originating from application server 121.

In some embodiments, cloud-based services can be implemented by pairing application server 121 and database server 123. Application server 121 can utilize database server 123 to provide certain services. For example, database server 123 can function as a configuration management database (CMDB) used by application server 121 for providing CMDB services. Among other information, database 123 can store configuration information related to managed assets, such as related hardware and/or software configurations. In some embodiments, database server 123 is a persistent computer storage that is network accessible and used to store and query customer data. In various embodiments, database server 123 can be utilized to store customer information for one or more different customers.

In some embodiments, database server 123 includes multiple database components (not shown) including a database service, a database storage, and a database buffer cache. The database service can respond to SQL commands and/or database APIs for inserting and/or querying database information such as database records. Database information is stored in the database storage and can include persistent customer database records. In some embodiments, a database index is also stored in the database storage. In various embodiments, the database cache or buffer cache is a cache used to improve database performance. For example, recent queries and/or the results of recent queries can be stored in the database cache. In some embodiments, the database cache is located in memory such as DRAM memory of database server 123 and may also be used to store/cache the database index. In some embodiments, the database index is stored in the database storage and/or a separate location from the database storage. By properly sizing the database buffer cache, the database server can properly respond to database queries within reasonable response times. As the request workload changes, sizing adjustments to the database cache can allow the database server to continue to efficiently respond to database queries.

Although single instances of some components have been shown to simplify the diagram, additional instances of any of the components shown in FIG. 1 may exist. For example, application server 121 may include one or more servers. Similarly, database server 123 may include one or more database servers and may not be directly connected to application server 121. For example, database server 123 and its components may be replicated and/or distributed across multiple servers and/or components. In some embodiments, components not shown in FIG. 1 may also exist.

Figure 2:
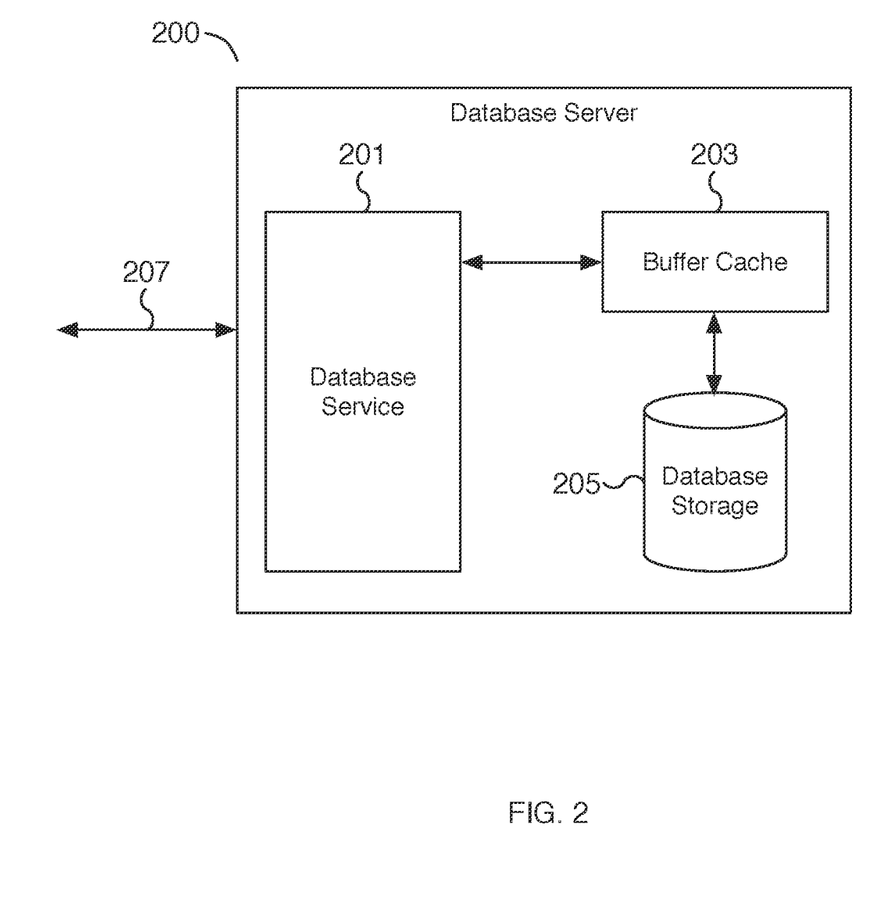
FIG. 2 is a block diagram illustrating an example of a database server used for a database-backed cloud service.

FIG. 2 is a block diagram illustrating an example of a database server used for a database-backed cloud service. In the example shown, database server 200 includes database service 201, database buffer cache 203, database storage 205, and network connection 207. In various embodiments, database server 200 functions as the backend database of one or more cloud services such as the services described with respect to FIG. 1. In some embodiments, database server 200 is database server 123 of FIG. 1 and network connection 207 communicatively connects database server 200 to application server 121 of FIG. 1.

In some embodiments, database service 201 receives and responds to incoming database requests via network connection 207. Database service 201 implements one or more database APIs and can process incoming database queries such as SQL queries. Database service 201 may serve incoming requests from buffer cache 203. In various embodiments, buffer cache 203 is a database cache or buffer cache that can be used for caching database data. In some embodiments, buffer cache 203 can cache requests as well as request results. In some embodiments, buffer cache 203 is a buffer pool or buffer pool cache. Corresponding database information is stored in database storage 205. In various embodiments, database storage 205 is persistent storage and can be used to store customer information (including information from different customers) in one or more database tables. The contents of database storage 205 can be cached in buffer cache 203. Database requests to database storage 205 can at times be served directly from buffer cache 203 for improved response times. In some embodiments, database server 200 includes a database index (not shown) and the database index can be cached in buffer cache 203.

In some embodiments, the database cache 203 is located in memory such as DRAM memory of database server 200. Database cache 203 should be sized appropriately to handle the workload of database server 200. Since the workload can change dynamically, at times, the size of the database cache 203 may no longer be optimal. Using the techniques of FIGS. 3-6, database cache 203 can be automatically and dynamically resized to meet changing requirements for database server 200.

Although single instances of some components have been shown to simplify the diagram of database server 200, additional instances of any of the components shown in FIG. 2 may exist. For example, database server 200 may include multiple instances of database service 201, for example, to process multiple requests in parallel. Database server 200 may also include multiple distributed (and/or replicated) database storage locations corresponding to multiple instances of database storage 205. As another example, multiple instances of buffer cache 203 can exist, for example, one or more for each instance of database storage 205. In some embodiments, components of database server 200 not shown in FIG. 2 may also exist.

Figure 3:
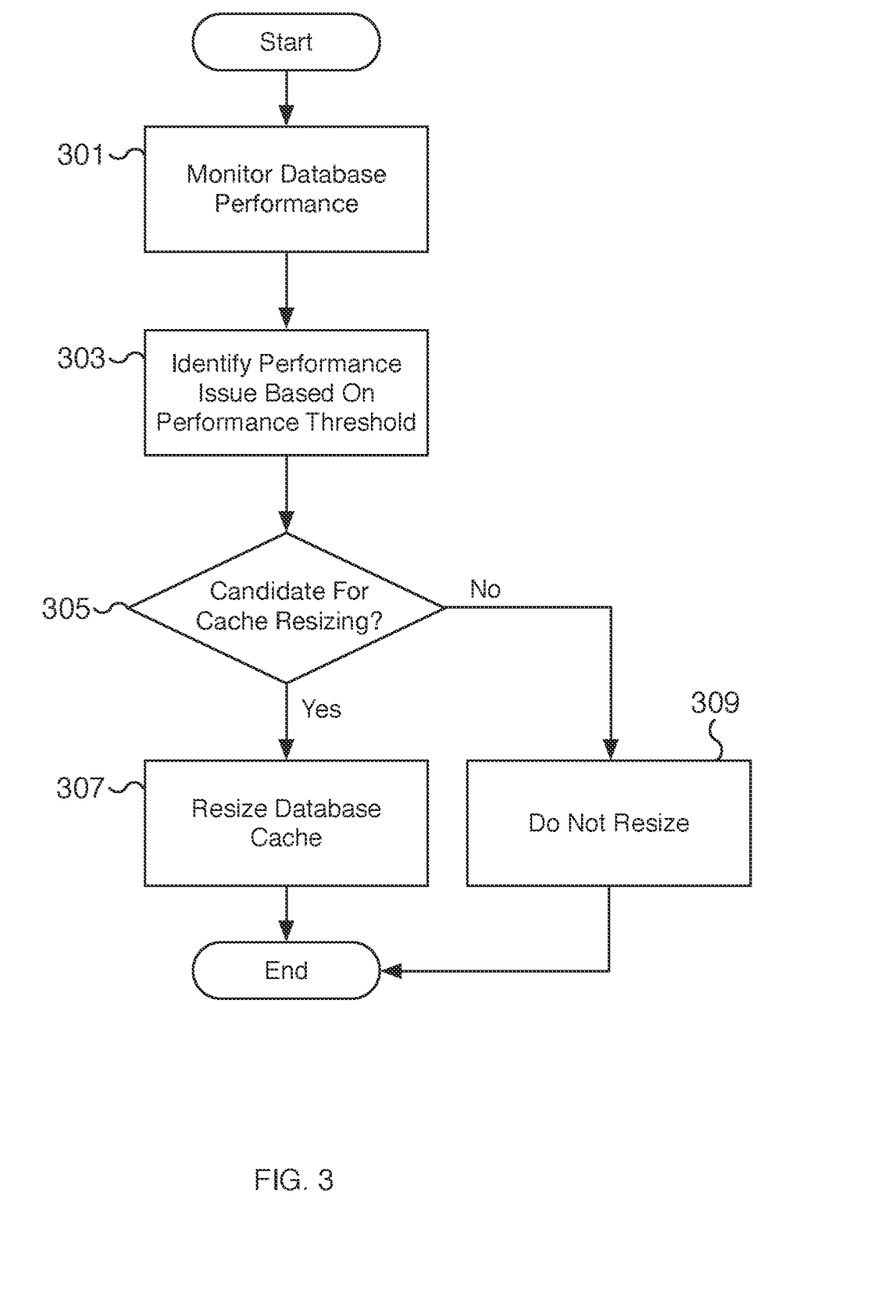
FIG. 3 is a flow chart illustrating an embodiment of a process for automatically sizing a database cache.

FIG. 3 is a flow chart illustrating an embodiment of a process for automatically sizing a database cache. By monitoring the performance of a database server, performance degradations can be detected and/or anticipated, and the database cache can be resized accordingly. In various embodiments, the process of FIG. 3 can be performed to determine when and whether the database buffer cache should be resized to maintain the operating and performance requirements of the database server and any associated services relying on the database server. In the event the cache of the database server is a candidate for resizing, an optimal new cache size is determined, and the cache is resized. In various embodiments, the process of FIG. 3 is performed on a database server such as database server 123 of FIG. 1 and/or database server 200 of FIG. 2.

At 301, the performance of a database is monitored. For example, the response times for database user requests are measured. By monitoring user request response times, a metric for the performance of the database can be determined. For example, an average response time can be determined by monitoring the database over a time period. In some embodiments, an average response time is tracked by measuring all or a sample of database user requests such as all or a sample of user SQL queries. In some embodiments, the response times are tracked based on customer and each customer's response times are measured and monitored separately. In some embodiments, only requests that are routine or frequent are tracked. For example, a daily or weekly query is tracked for its performance, but a one-off query is not. In some embodiments, a user query is identified for monitoring when the database query has been performed at least a threshold number of times. The threshold count and period over which the requests must exceed the count for its performance to trigger monitoring may be configured.

At 303, a performance issue is identified based on a performance threshold. For example, a user query is identified as a slow query that indicates an issue with the performance of the database. In some embodiments, a slow query is a query that should have completed more quickly, for example, with a response time closer to the average query response time of the database. In some embodiments, a performance issue and the related slow query are identified by comparing the response time of a user query to a performance threshold. The performance threshold can be based on the average query response time measured at 301. In some embodiments, the performance threshold is a multiple of the average response time or another database performance metric. For example, the performance threshold can be twice the average response time or another appropriate performance metric of the database. In the event a query's response time is greater than the performance threshold, the query is identified as a slow query and an issue related to the performance of the database is identified for additional analysis. Depending on the scenario, the performance issue may be resolved by resizing the database cache to a new appropriate size.

In some embodiments, performance issues are identified only for relevant user queries. For example, in some embodiments, performance issues may not be identified for a one-off query. However, a query that is routinely executed is a relevant query that can trigger the identification of a performance issue. For example, in the event a routine user query does not meet the performance threshold during one or more executions of the query, a performance issue is identified. In some embodiments, a user query is relevant when the database query has been performed at least a threshold number of times. The threshold count and period over which the requests must exceed the count for consideration as a relevant query to trigger performance issues may be configured.

At 305, a determination is made whether the database is a candidate for cache resizing. In the event the database is a candidate for cache resizing, processing proceeds to step 307 for resizing the database cache. In the event the database is not a candidate for cache resizing, processing proceeds to step 309 where the database cache is not resized.

At 307, the database cache is resized. For example, the database is a candidate for resizing its database cache to improve or at least maintain the performance of the database server. A new and more appropriate database cache size is determined. In some scenarios, the cause for the performance issue may be related to an increase in the database data stored for a customer. For example, a new customer table may be populated with a large new dataset and the database cache size should be adjusted accordingly. In some embodiments, the database cache size can be resized based on the current size of the relevant database and corresponding tables. For example, a new cache size can be based on the current size of the database storage and database index.

At 309, the database cache is not resized. For example, the database is not a good candidate for cache resizing. Most likely a change in the database cache size will not address the issue with performance identified at 303. Additional analysis can be performed to identify the cause of the performance issue. For example, the issue may be a poorly constructed query, a hardware issue, a software performance limitation, etc. that is unrelated or at least not directly related to the database cache size.

Figure 4:
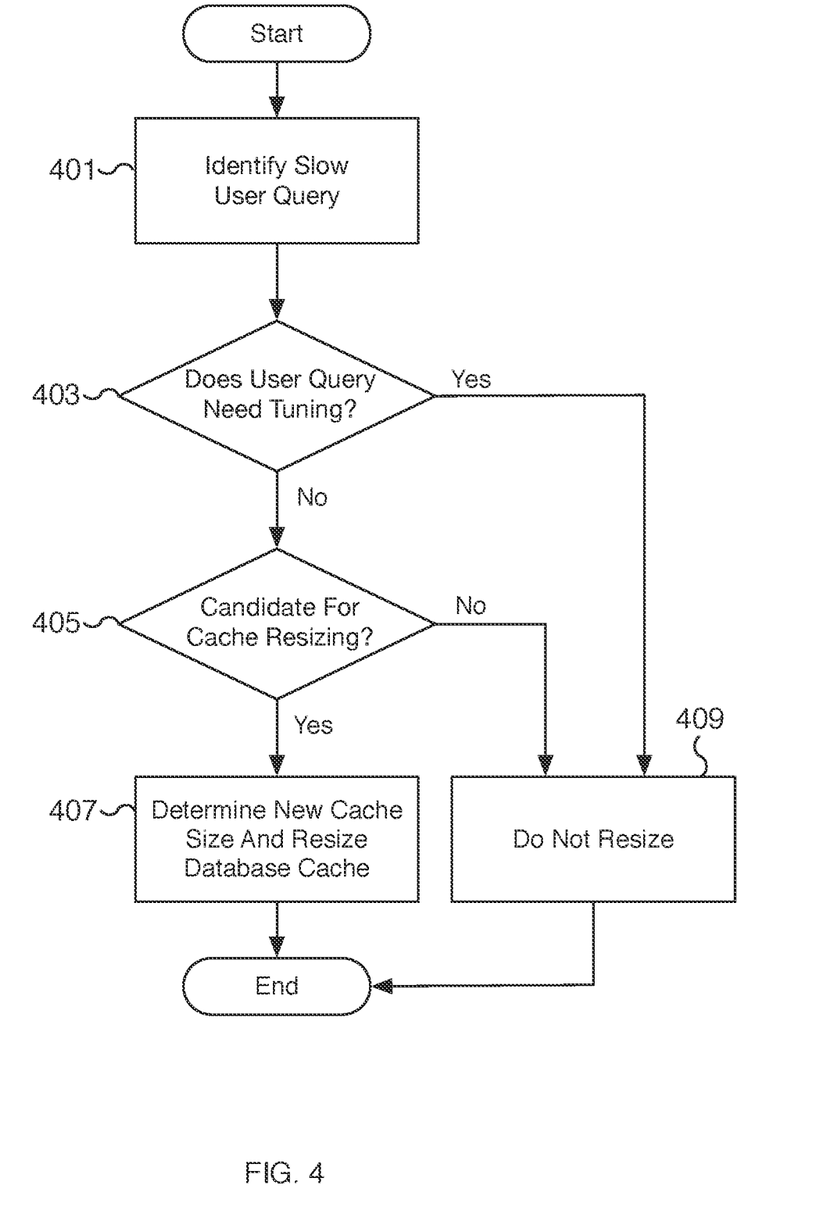
FIG. 4 is a flow chart illustrating an embodiment of a process for automatically sizing a database cache.

FIG. 4 is a flow chart illustrating an embodiment of a process for automatically sizing a database cache. By identifying a slow user query, additional analysis can be performed using the identified slow query to determine whether it is appropriate to resize the database cache. In the event the cache of the database server is a candidate for resizing, an optimal new cache size is determined, and the cache is resized. In various embodiments, the process of FIG. 4 is performed on a database server such as database server 123 of FIG. 1 and/or database server 200 of FIG. 2. In some embodiments, step 401 is performed at 301 and/or 303 of FIG. 3, steps 403 and/or 405 are performed at 305 of FIG. 3, step 407 is performed at 307 of FIG. 3, and step 409 is performed at 309 of FIG. 3.

At 401, a slow user query is identified. For example, a user database query is identified as slow in the event the query does not meet a first performance threshold. The first performance threshold may be a multiple of the response time of the database or another appropriate metric.

At 403, a determination is made whether the user query needs tuning. In the event the user query needs tuning, processing continues to 409 where the database cache is not resized. In the event the user query does not need tuning, processing continues to 405 for additional analysis of the slow query.

At 405, a determination is made whether the database is a candidate for cache resizing. In the event the database is a candidate for cache resizing, processing proceeds to step 407 for resizing the database cache. In the event the database is not a candidate for cache resizing, processing proceeds to step 409 where the database cache is not resized.

At 407, a new database cache size is determined, and the database cache is resized. For example, the database is a candidate for resizing its database cache to improve or at least maintain the performance of the database server. After resizing, subsequent queries using the slow user query identified at 401 will no longer have performance issues. The new cache size is determined, for example, based on the database storage size. In some embodiments, the new cache size also considers the size of the database index. In various embodiments, a new cache size is automatically determined and used to resize the database cache.

At 409, the database cache is not resized. For example, the database is not a good candidate for cache resizing and most likely a change in the database cache size will not address the issue with the slow performance of the user query identified at 401. Instead, in most cases, the slow query can be tuned to perform better.

Figure 5:
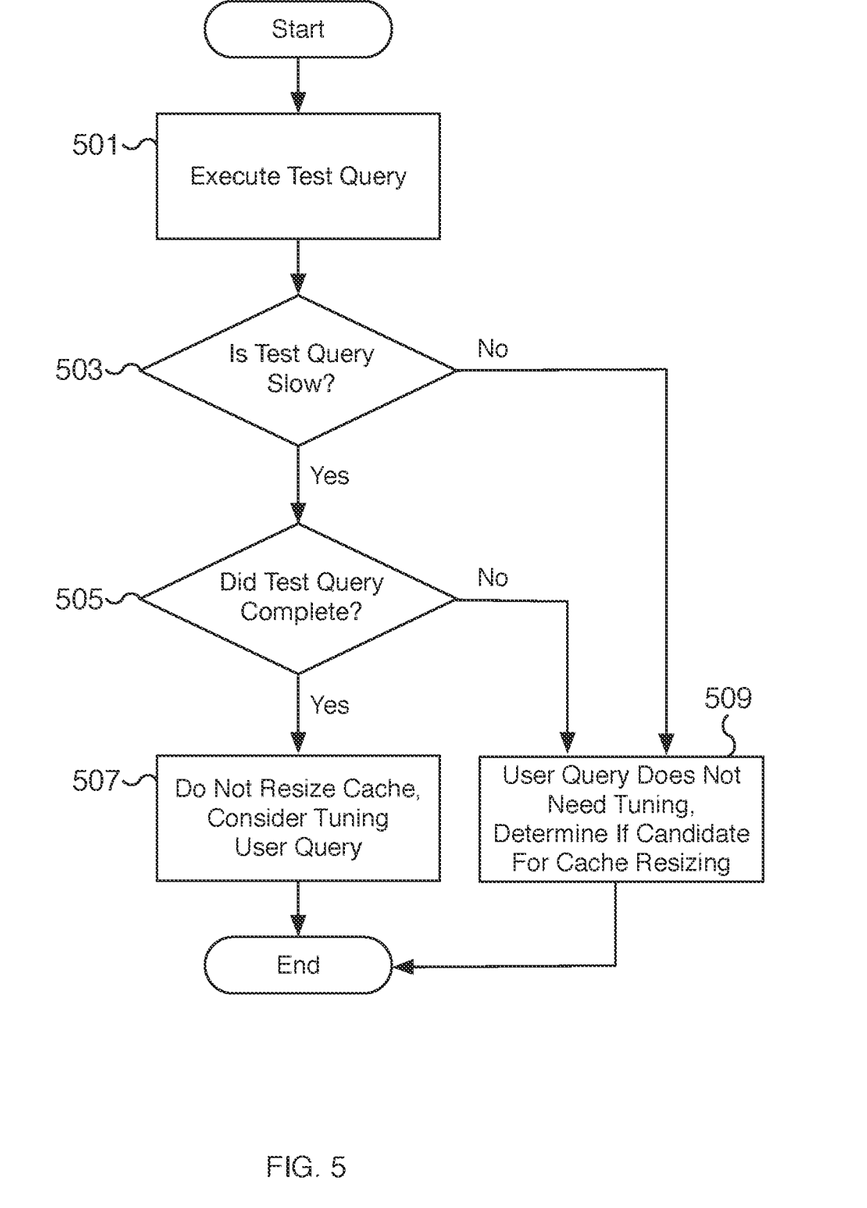
FIG. 5 is a flow chart illustrating an embodiment of a process for automatically sizing a database cache using a test query.
Figure 6:
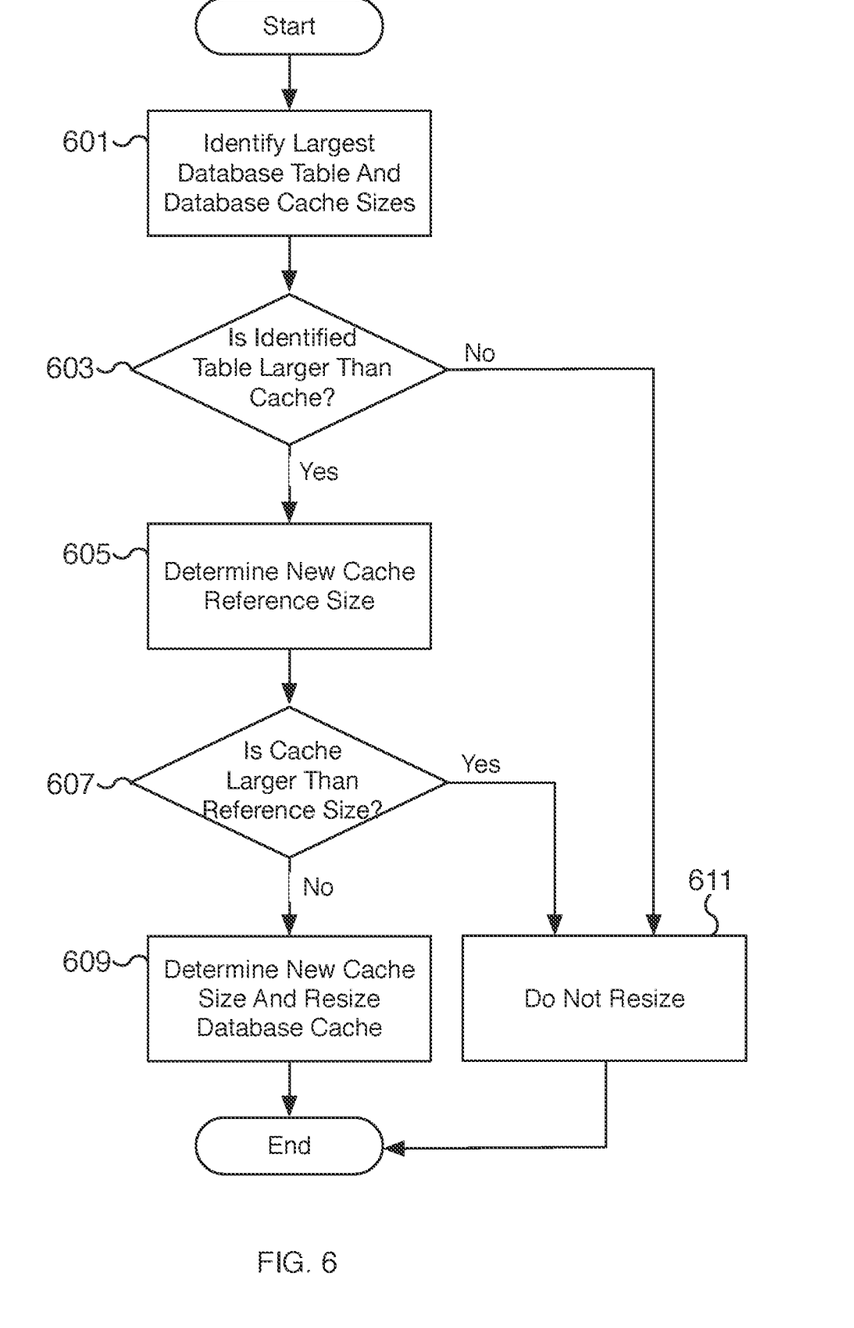
FIG. 6 is a flow chart illustrating an embodiment of a process for automatically sizing a database cache.

FIG. 5 is a flow chart illustrating an embodiment of a process for automatically sizing a database cache using a test query. For example, a test query based on an identified slow user query is used to determine whether the database should be eliminated as a candidate for database cache resizing. In some scenarios, the performance issue is not directly related to the database cache size and database cache resizing is not appropriate. Instead, the database is eliminated as a candidate for cache resizing and the query is considered for tuning. In the event the cache of the database server is a candidate for resizing, the additional analysis of FIG. 6 is performed to determine whether and by how much to resize the cache. In various embodiments, the process of FIG. 5 is performed on a database server such as database server 123 of FIG. 1 and/or database server 200 of FIG. 2. In some embodiments, the slow user query is the slow user query identified at 401 of FIG. 4. In some embodiments, steps 501, 503, and/or 505 are performed at 403 of FIG. 4, step 507 is performed at 409 of FIG. 4, and/or step 509 is performed at 407 of FIG. 4.

In some embodiments, the process of FIG. 5 is performed multiple times for a single slow user query. For example, multiple test queries are executed to determine whether to eliminate the database as a candidate to automatically resize the database cache. In the discussion below, the process is described with respect to using a single test query. For multiple test queries, a threshold requirement of results can be utilized to determine whether the test query is slow at 503 and/or completes at 505.

At 501, a test query is executed. For example, a slow user query identified as related to a performance issue is replicated as a test query. The test query is executed and its performance is monitored.

At 503, a determination is made whether the test query is slow. In the event the test query is slow, processing continues to 505 for additional analysis of the test query. In the event the test query is not slow, processing continues to 509. In various embodiments, a test query is slow if the test query does not meet a performance threshold. For example, in some embodiments, the test query is slow in the event the response time of the test query is greater than a performance threshold. The performance threshold applied can be based on the average response time of the database. In some embodiments, the performance threshold is a multiple of the average response time, the same performance threshold used to identify the slow user query (e.g., the performance threshold used at 303 of FIGS. 3 and/or 401 of FIG. 4), and/or another database performance metric. For example, the performance threshold can be twice the average response time or another appropriate performance metric of the database.

At 505, a determination is made whether execution of the test query successfully completed. In the event the test query successfully completed, processing continues to 507. In the event the test query did not successfully complete, processing continues to 509 for additional database cache resizing consideration.

At 507, the database cache is not resized and the user query can be considered for tuning. For example, the database is not a good candidate for cache resizing and most likely a change in the database cache size will not address the issue with the slow performance of the test query and corresponding user query. Instead, in most cases, the slow user and test query can be tuned to perform better and the user query should be considered a candidate for tuning to resolve the performance issue.

At 509, a determination is made that the user query does not need tuning and additional analysis is performed to determine whether the database is a candidate for cache resizing. Since the test query was either not slow or was slow and did not complete, the database performance issue might be resolved by resizing the database cache. A test query that is not considered slow can indicate that the test query response was served from the database cache and an incomplete test query can indicate that the cache is too small to store the response from the slow user query. Either scenario when combined with the initial slow user query indicates that the database cache size may be too small for the expected workload and may require resizing. At 509, additional analysis is performed to determine whether and by how much the database cache should be resized. In some embodiments, the additional analysis is described with respect to FIG. 6.

FIG. 6 is a flow chart illustrating an embodiment of a process for automatically sizing a database cache. In various embodiments, the process of FIG. 6 is performed in the event the results of one or more test queries indicate that a user query is not slow due to a lack of tuning issue. Instead, the database may benefit by resizing the database cache. The process of FIG. 6 determines whether and by how much the database cache should be resized. In various embodiments, the process of FIG. 6 is performed on a database server such as database server 123 of FIG. 1 and/or database server 200 of FIG. 2. In some embodiments, the process of FIG. 6 is performed at 405, 407, and/or 409 of FIG. 4 and/or at 509 of FIG. 5.

At 601, the size of the largest database table and the size of the database cache are identified. For example, the largest table of the database is identified along with its size. In the event the database is shared by multiple customers, the largest table identified may be limited to the customer whose database cache is under consideration for resizing and to whom the slow user query is directed to. In various embodiments, the corresponding database cache size is identified. In some embodiments, the database cache is implemented as a database buffer or database buffer pool. The database cache may contain cached database information including one or more database indices.

At 603, a determination is made whether the identified table is larger than the database cache. In the event the identified table is larger than the database cache, processing continues to 605. In the event the identified table is not larger than the database cache, processing continues to 611.

At 605, a new cache reference size is determined. For example, a new reference size is determined and is used at step 609 to calculate the new cache size if resizing is deemed appropriate. At 609, a new cache size is based on the determined reference size at 605, for example, by multiplying the reference size by a scaling factor. In various embodiments, the reference size is based on the size of the database storage. In some embodiments, the reference size also includes the size of the database index. For example, the reference size may be the sum of the database storage and database index size. Additional reference size components may be appropriate as well. In various embodiments, the reference size includes multiple components that are independently scaled.

In some embodiments, multiple customers share the same database and/or database server and the reference size may be calculated based on each customer individually. For example, with a shared database server, the reference size may be calculated for each customer individually by only considering the customer's database storage and corresponding database indices.

At 607, a determination is made whether the database cache is larger than the reference size. In the event the database cache is larger than the reference size, processing continues to 611. In the event the database cache is not larger than the reference size, processing continues to 609.

At 609, a new cache size is determined and the database cache is resized. The new cache size is based on the reference size determined at 605. For example, the new cache size can be a percentage of the reference size. In some embodiments, the percentage is between 65% and 75%. For example, the new cache size can be 5/7th or approximately 71.4% of the reference size (or of the sum of the database storage and index size). In some embodiments, the new cache size is based on the storage size for a particular customer. In the event the new cache size exceeds the limits of the database server, one or more cache buffers and corresponding database tables may require evicting. For example, one or more customers are migrated to a new database server and the corresponding resources are released to make room for resizing. In some embodiments, the cache size of a first customer is increased and the database tables of a second customer are evicted from the shared database server and migrated to a different server. The new cache size is based on the first customer's database requirements without consideration of the evicted database tables and related indices. Using the newly determined cache size, the database cache is resized. Alternatively, in some embodiments, the customer needing cache resizing is evicted and migrated to a new server. The database cache of the new server is configured using the newly determined cache size. The remaining customers and their associated database tables remain on the original database server and do not require resizing of their associated database caches.

In some embodiments, the new cache size is determined by applying one or more scaling factors to the components of the reference size determined at 605. In some embodiments, the reference size is a multiple component reference size based on different database requirements for the customer. For example, a first reference size component can be the size of the customer's database storage and a second reference size component can be the size of the customer's database indices. Additional database requirements may be considered as additional reference size components such as common or routine customer database queries. In various embodiments, each reference size component has a corresponding scaling factor. For example, a first reference size component based on the size of the customer's database storage can have a scaling factor of 5/7th or approximately 71.4% while a second reference size component based on the size of the customer's database indices can have a scaling factor of 1.0 or 100%. In some embodiments, one or more additional size offsets are used to calculate the new database cache size. For example, an additional size offset is added to the sum of the scaled reference size components to determine the new database cache size. As another example, a different offset can be added to each reference size component prior to scaling.

At 611, the database cache is not resized. For example, the database is not a good candidate for cache resizing and most likely a change in the database cache size will not address the performance issue. In some scenarios, the database cache is already properly sized for user requests and does not need resizing.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
    performing a test query of a database in response to determining that a performance associated with a user database query of the database does not satisfy a first performance threshold; and
    in response to a determination that the performance of the test query satisfies a second performance threshold, resizing a database buffer cache of the database, wherein resizing the database buffer cache includes:
        determining a metric based at least in part on a storage size of the database and an index size of the database; and
        resizing the database buffer cache of the database based on the metric and a size of the database buffer cache.

2. The method of claim 1, wherein the metric is based at least in part on a sum of the storage size of the database and the index size of the database.

3. The method of claim 1, wherein resizing the database buffer cache includes comparing the size of the database buffer cache of the database against the metric.

4. The method of claim 1, wherein the first performance threshold is based on an average response time of the database.

5. The method of claim 4, wherein determining that the performance of the user database query to the database does not meet the first performance threshold includes determining that a response time of the user database query is at least twice the average response time of the database.

6. The method of claim 1, wherein the performance of the user database query to the database was determined in response to an identification that the user database query has been performed at least a threshold number of times.

7. The method of claim 1, wherein the first performance threshold is equal to the second performance threshold.

8. The method of claim 1, wherein the first performance threshold is greater than the second performance threshold, and wherein the second performance threshold is an average response time of the database.

9. The method of claim 1, further comprising:
    increasing a size of the database buffer cache of the database.

10. The method of claim 9, wherein the increase in the size of the database buffer cache is based on a percentage of a storage size associated with the database.

11. The method of claim 9, wherein the increase in the size of the database buffer cache is based on a percentage of a sum of a storage size and an index size associated with the database.

12. The method of claim 9, wherein the increase in the size of the database buffer cache is based on a sum of a first percentage of a storage size associated with the database and a second percentage of an index size associated with the database, wherein the first percentage is different from the second percentage.

13. The method of claim 1, further comprising:
    in response to increasing a size of the database buffer cache, evicting one or more tables of the database.

14. The method of claim 13, wherein the increase in the size of the database buffer cache is based on a storage size of remaining tables associated with the database.

15. The method of claim 13, wherein evicting the one or more tables of the database includes migrating the evicted one or more tables of the database to a different database server.

16. The method of claim 15, further comprising:
    identifying one or more database tables associated with a first customer; and
    identifying one or more database tables associated with a second customer, wherein the second customer is different from the first customer, wherein the migrated one or more tables are associated with the second customer.

17. A system comprising:
    one or more processors; and
    a memory coupled to the one or more processors, wherein the memory is configured to provide the one or more processors with instructions which when executed cause the one or more processors to:
        perform a test query of a database in response to determining that a performance associated with a user database query of the database does not satisfy a first performance threshold; and
        in response to a determination that the performance of the test query satisfies a second performance threshold, resize a database buffer cache of the database, wherein causing the one or more processors to resize the database buffer cache includes causing the one or more processors to:
            determine a metric based at least in part on a storage size of the database and an index size of the database; and
            resize the database buffer cache of the database based on the metric and a size of the database buffer cache.

18. The system of claim 17, wherein the metric is based at least in part on a sum of the storage size of the database and the index size of the database.

19. A computer program product embodied in a non-transitory computer readable medium and comprising computer instructions for:
    performing a test query of a database in response to determining that a performance associated with a user database query of the database does not satisfy a first performance threshold; and
    in response to a determination that the performance of the test query satisfies a second performance threshold, resizing a database buffer cache of the database, wherein resizing the database buffer cache includes:
        determining a metric based at least in part on a storage size of the database and an index size of the database; and
        resizing the database buffer cache of the database based on the metric and a size of the database buffer cache.

20. The computer program product of claim 19, wherein the metric is based at least in part on a sum of the storage size of the database and the index size of the database.

* * * * *